(12) United States Patent
Doemer et al.

(10) Patent No.: US 8,693,008 B2
(45) Date of Patent: Apr. 8, 2014

(54) METHOD FOR OPERATING A LASER SCANNER AND PROCESSING SYSTEM WITH LASER SCANNER

(75) Inventors: Holger Doemer, Bopfingen (DE); Ruediger Rosenkranz, Dresden (DE)

(73) Assignees: Carl Zeiss Microscopy GmbH, Jena (DE); Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 69 days.

(21) Appl. No.: 13/565,147

(22) Filed: Aug. 2, 2012

(65) Prior Publication Data

US 2013/0057874 A1 Mar. 7, 2013

(30) Foreign Application Priority Data

Aug. 4, 2011 (DE) .......................... 10 2011 109 449

(51) Int. Cl.
*G01B 11/14* (2006.01)

(52) U.S. Cl.
USPC .......................................... 356/614

(58) Field of Classification Search
USPC .......................................... 356/614; 250/250
See application file for complete search history.

(56) References Cited

U.S. PATENT DOCUMENTS

| | | | |
|---|---|---|---|
| 6,501,061 B1 * | 12/2002 | Kitai et al. ................. | 250/205 |
| 6,855,938 B2 | 2/2005 | Preikszas et al. | |
| 2005/0184251 A1 | 8/2005 | Oi et al. | |
| 2005/0205778 A1 | 9/2005 | Kitai et al. | |
| 2009/0309025 A1 | 12/2009 | Preikszas | |
| 2010/0051828 A1 | 3/2010 | Doemer et al. | |
| 2011/0198326 A1 | 8/2011 | Doemer | |

FOREIGN PATENT DOCUMENTS

EP  1 173 302 B1  4/2005

OTHER PUBLICATIONS

German Office, with English translation, for corresponding DE Appl No. 10 2011 109 449.4, dated Jan. 27, 2012.
Extended European search report for corresponding EP Appl No. 12005670.0-1709, dated Jul. 10, 2013.

* cited by examiner

*Primary Examiner* — Tarifur Chowdhury
*Assistant Examiner* — Jamil Ahmed
(74) *Attorney, Agent, or Firm* — Fish & Richardson P.C.

(57) ABSTRACT

A method includes using a scanner to scan a laser beam along a scan path, and detecting light intensities caused by laser light of the laser beam incident on a detection cross-section. The method also includes determining a position of the detection cross-section relative to the laser scanner based on the detected light intensities. The scan path includes, in a plane which includes the detection cross-section, a first partial path and a second partial path which extend adjacent to each other and at a distance from each other which is: a) smaller than a diameter of the detection cross-section plus a diameter of the laser beam in the plane which includes the detection cross-section; and b) greater than 0.3 times the diameter of the laser beam in the plane which includes the detection cross-section or greater than 0.3 times the diameter of the detection cross-section.

20 Claims, 4 Drawing Sheets

METHOD FOR OPERATING A LASER SCANNER AND PROCESSING SYSTEM WITH LASER SCANNER

CROSS-REFERENCES TO RELATED APPLICATION

This application claims priority under 35 USC 119 to German Patent Application No. 10 2011 109 449.4, filed Aug. 4, 2011, the entire contents of which are incorporated by reference herein.

FIELD

The present disclosure relates to methods of operating a laser scanner and to a processing system with a laser scanner. In particular, the present disclosure relates to method of calibrating a laser scanner.

BACKGROUND

It is known to use laser beams to process objects, for example to change material properties of an object, or to remove material from an object. For this purpose a laser beam having a sufficiently high beam energy and adequate photon energy is directed via a laser scanner at previously determined processing locations of the object. This is achieved by setting scan deflections of the laser scanner as a function of coordinates of the processing locations in a coordinate system of the laser scanner. For this purpose, the coordinates of the desired processing locations are converted into deflections of the laser scanner. This can be achieved by a suitable mathematical coordinate transformation.

Such coordinate transformation is preferably calibrated. This can be achieved, for example, by using of a detector, arranged behind an aperture which has a known diameter and is arranged at a known location in the coordinate system, by the laser beam being scanned by the laser scanner through the aperture. The laser beam scanned through the aperture can be the laser beam with which the processing of the object is also carried out, or it may be a different laser beam, the beam path of which has a known relation to the laser beam with which the processing of the object is carried out. In accordance with signals detected by the detector, the scan deflection of the laser scanner corresponding to the location of the aperture can be determined, and the coordinate transformation thereby calibrated. This process can be repeated for a plurality of known locations at which the aperture is arranged. Such devices and methods are known from U.S. Pat. No. 6,501,061 B1 and US 2005/0205778 A1, the full disclosure of which is incorporated into the present application by reference.

Determining the position of the aperture relative to the laser scanner based on the signals detected by the detector involves a significant period of time, which extends the overall processing time for an object with a laser processing system.

SUMMARY

The disclosure provides a method for operating and calibrating a laser scanner allowing to determine a position of a specific detection cross-section, such as an aperture, relative to the laser scanner in a shorter period of time and/or with an increased accuracy. The disclosure also provides a corresponding processing system which includes a laser scanner.

In accordance with embodiments of the disclosure, a method of operating a laser scanner includes calibrating the laser scanner by scanning a laser beam with the laser scanner along a scan path, and detecting of light intensities induced by laser light incident on a detection cross-section. The method also includes determining of a position of the detection cross-section relative to the laser scanner based on the detected light intensities. The detection cross-section can be provided by a photosensitive area of a detector for laser light or an aperture having a well-defined cross-section. A detector for laser light detects light traversing the aperture cross-section.

In accordance with further embodiments, a method of operating a laser scanner includes scanning of a laser beam with the laser scanner along a scan path which includes, in a plane containing a detection cross-section, a first partial path and a second partial path which extend side-by-side at a distance from each other. The distance is smaller than the diameter of the detection cross-section plus the diameter of the laser beam in this plane. The distance is greater than 0.3 times the diameter of: a) the laser beam in the plane and/or b) the detection cross-section. Thus, the scanning of the laser beam along the first partial path and the scanning of the laser beam along the second partial path each result in separately detectable light intensities which can be compared to each other, and therefore facilitate a relatively precise determination of the location of the detection cross-section relative to the two partial paths, and hence also relative to the laser scanner.

According to further embodiments, the method further includes repeatedly modifying the scan path by displacing the first and the second partial paths while the distance between the first and second partial paths can be maintained constant. The repeated modification of the scan path by displacing the first and the second partial paths can take place until the detected light intensities achieved when scanning along the first partial path and the light intensities achieved when scanning along the second partial path are substantially equal and/or until a difference between these light intensities is substantially zero.

It can then be concluded that a center of the detection cross-sections is located exactly between the two partial paths. The position of the detection cross-section relative to the laser scanner can therefore be precisely determined, when seen in a direction perpendicular to the extension direction of the two partial paths in a region of the detection cross-section.

According to particular embodiments, the laser beam is further scanned along a third partial path and a fourth partial path, which extend in the plane of the detection cross-section at a distance from each other which is smaller than the diameter of the detection cross-section plus the diameter of the laser beam, and which is greater than 0.3 times the diameter of the laser beam and/or greater than 0.3 times the diameter of the detection cross-section, wherein, in the region of the detection cross-section, the third partial path extends relative to the first partial path at an angle which is greater than 30°, and in particular greater than 50° and in particular greater than 70°. In particular, this angle can be substantially 90°. Thus, it is also possible to precisely determine the position of the detection cross-section relative to the laser scanner in a direction perpendicular to the extension direction of the third and fourth partial path. Together with the determination of the position of the detection cross-section perpendicular to the first and the second partial path, the precise determination of the position of the detection cross-section is thus possible in two independent directions in the plane of the detection cross-section.

In accordance with exemplary embodiments, the first and the second partial paths and/or the third and fourth partial paths each extend parallel to each other or/and at a constant distance from each other. In accordance with other embodiments, the first partial path and the second partial path and/or the third partial path each and the fourth partial path each extend along a straight line.

In accordance with further exemplary embodiments, the first partial path and the second partial path and/or the third partial path and the fourth partial path are scanned in opposite directions. This allows repeated subsequent scanning of the respective two partial paths.

In accordance with further embodiments, the detection cross-section is provided on an object holder for mounting an object to be processed, and the method also includes determination of a coordinate transformation between a coordinate system of the laser scanner and a coordinate system of the object holder based on the position of the detection cross-section relative to the laser scanner. Due to this, it is then possible to direct the laser beam via the laser scanner onto any desired locations of the object holder or of the object mounted thereon. According to embodiments herein the method also includes a processing of the object with a laser beam directed by the laser scanner onto the desired locations of the object. The laser beam can in this case be the same laser beam which is used to define the position of the detection cross-section relative to the laser scanner, or it may be a laser beam which is different to this for processing the object, which is also controlled by the laser scanner and the beam path of which has a known relation to the laser beam which is used to define the position of the detection cross-section relative to the laser scanner. The processing of the object can in particular be a modification of material properties of the object and a removal of material from the object.

In accordance with exemplary embodiments, it is possible in this case to provide a plurality of detection cross-sections on the object holder, such as, for example, three detection cross-sections, and to determine the positions of each of the plurality of detection cross-sections relative to the laser scanner and to determine the coordinate transformation based on the specific positions of the plurality of detection cross-sections. Thus, it is possible to define a suitable coordinate transformation with increased precision. The positions of the plurality of detection cross-sections are each defined in the same way as explained above for a single detection cross-section.

In accordance with embodiments, there is also provided a processing system including a laser scanner, wherein the processing system is configured to execute the previously described methods.

In accordance with other embodiments, a processing system includes: a laser scanner, a detector for laser light incident on a predefined detection cross-section, and a controller controlling the laser scanner and receiving detection signals from the detector, wherein the controller is configured to control the laser scanner such that the laser beam is scanned along a scan path which includes, in a plane containing the detection cross-section, a first partial path and a second partial path extending side-by-side at a distance from each other which is smaller than a diameter of the detection cross-section plus a diameter of the laser beam in the plane containing the detection cross-section, and which is greater than 0.3 times the diameter of the laser beam in the plane containing the detection cross-section and/or which is greater than 0.3 times the diameter of the detection cross-section, and wherein the controller includes a control module which is configured to compare detected first light intensities caused by the laser light incident on the detection cross-section when scanning along the first partial path, with detected second light intensities caused by the laser light incident on the detection cross-section when scanning along the second partial path.

According to specific embodiments herein the processing system also includes at least one particle beam column which is configured to detect a position of the detection cross-section, or of the plurality of detection cross-sections, relative to the particle beam column. The at least one particle beam column can also be configured to obtain a microscopic image of an object, to deposit material on the object or to remove material from the object.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

DETAILED DESCRIPTION OF EXEMPLARY EMBODIMENTS

Figure 1:
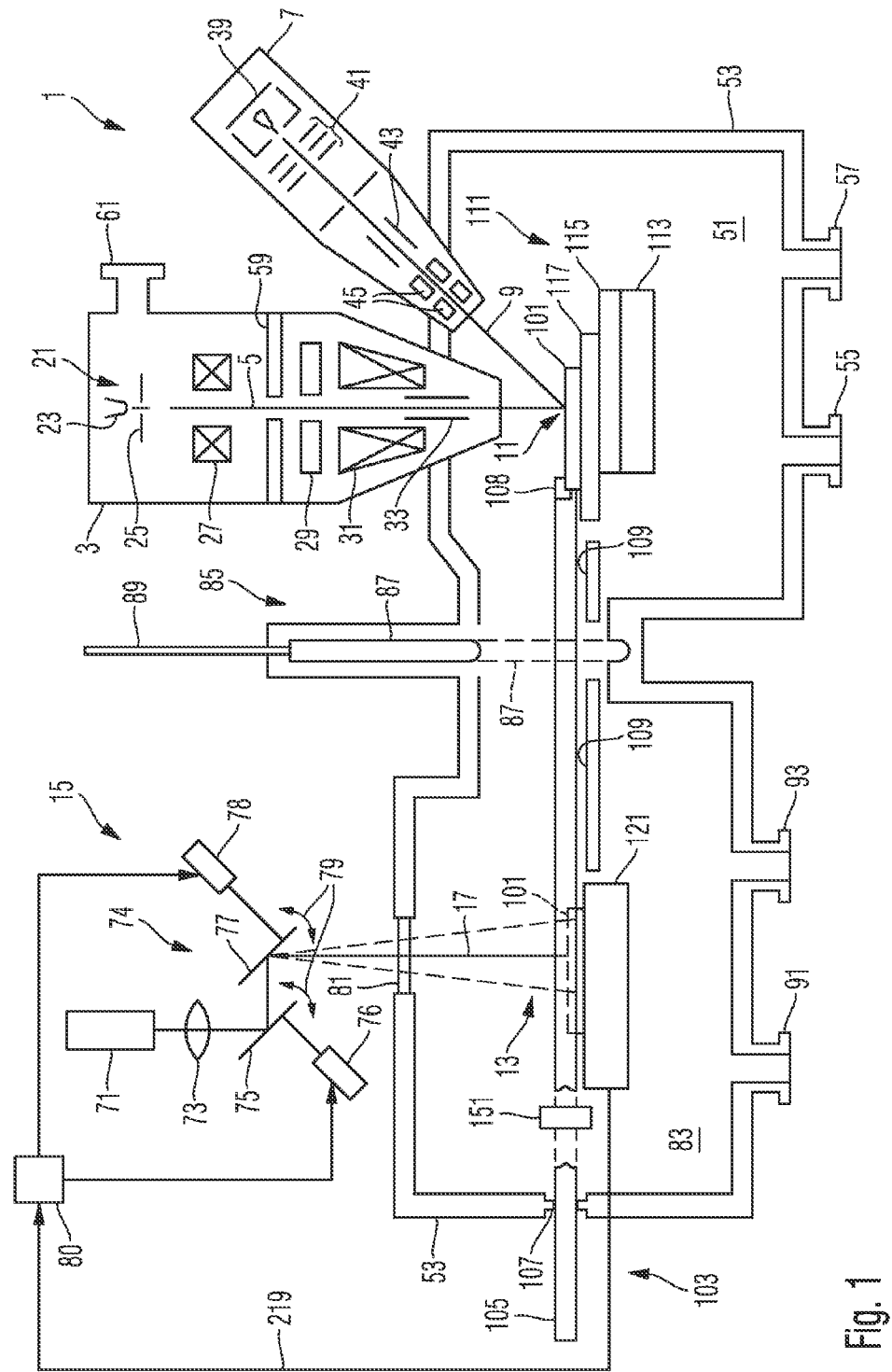
FIG. 1 is a schematic representation of a laser processing system.

In the exemplary embodiments described below, components that are alike in function and structure are designated as far as possible by alike reference numerals. Therefore, to understand the features of the individual components of a specific embodiment, the descriptions of other embodiments and of the summary of the disclosure should be referred to.

FIG. 1 is a schematic representation of a processing system 1. This processing system is configured to carry out a processing of an object with a laser beam and with multiple particle beams. Background information on such systems can be found, for example, in US 2011/0198326 A1, the full disclosure of which is incorporated in the present patent application by reference.

The processing system 1 includes two particle beam columns, namely an electron beam column 3 for generating an electron beam 5, and an ion beam column 7 for generating an ion beam 9, which like the electron beam 5 is directed at locations within a processing region 11.

The electron beam column 3 serves to direct the electron beam 5 onto an object which is arranged within the processing region 11, and to detect interaction particles, for example secondary electrons, back-scattered electrons or transmitted electrons, and/or interaction radiation, such as X-rays or cathodoluminescence radiation. If the electron beam is directed at different locations on the object and detected intensities are associated with these locations, an electron microscopic image of a portion of the object can be determined. It is possible, on the basis of such electron microscopic image, to determine processing locations on the object which involve further processing. The further processing may include depositing of material at the processing locations or removal of material from the processing locations.

The ion beam column 7 is used to direct the ion beam 9 onto such processing locations. The ion beam 9 may remove material at the object processing location, and it can also induce a deposition of material on the surface. For this purpose, it is possible to supply a process gas to the processing location, wherein the process gas is activated by the ion beam, and to remove material from the object or deposit material on the object. The ion beam can also, similarly to the electron beam, be used to generate an image of the object.

The removal of material from the object by the ion beam 9 is only possible at a limited rate. If material removal is desired to an extent which would take too long a time at the removal rate applied by the ion beam, then the material removal can be effected by a laser beam. To achieve this, the object is transported into a scanning range 13 of a laser beam 17 emitted by a laser scanner 74, in order to remove material from the object using the laser beam. The rate of material removal by the laser beam is greater than that by the ion beam. Accordingly, relatively large material removal rates are obtainable with the laser beam.

The electron beam column 3 includes an electron source 21 including a cathode 23 and an anode 25, a condenser lens system 27 for generating the beam 5, a secondary-electron detector 29 which is arranged, for example, within the column 3, and an objective lens 31, to focus the electron beam 5 within the processing area 11. Beam deflectors 33 are provided to vary the location of incidence of the electron beam 5 on the object and, for example, to scan the processing region of the surface of the object and to detect produced or released particles, such as secondary electrons, with the detector 29, in order to obtain an electron-microscopic image of the object in the scanned processing region 11.

The ion beam column 7 includes an ion source 39 and electrodes 41 for forming and accelerating the ion beam 9, and beam deflectors 43 and focusing coils or focusing electrodes 45, in order to focus the ion beam 9 within the processing area 11 and to scan it over a region of the object.

A vacuum space 51 is defined by a vacuum chamber wall 53, which has a pump port 55 connected to a vacuum pump and which can be ventilated via a port 57. In order to permanently hold the electron source 21 under a sufficiently good vacuum, even if process gas is introduced into the vacuum chamber 51, the electron column 3 includes a aperture 59 and a further pump port 61, in order to evacuate a vacuum portion including the electron source 21 by a separate vacuum pump.

Background information on systems which use multiple particle beams for processing a sample can be obtained from US 2005/0184251 A1, U.S. Pat. No. 6,855,938 and US 2009/0309025 A1, wherein the full disclosure of these publications is incorporated into the present application by reference.

The laser system 15 includes a laser 71 and a lens 73, to shape and focus the laser beam 17. The laser beam 17 is directed via one or more mirrors or fiber-optic light guides to a location near the vacuum chamber wall 53 of a vacuum space 83 where it is incident on a laser scanner 74 including two scanning mirror 75, 77, which can be pivoted via actuators 76 or 78, as is indicated by arrows 79. The pivoting of the mirrors 75, 77 by the actuators 76, 78 takes place in directions oriented at an angle to each other, and in particular orthogonal to each other, so that the laser beam 17 can be deflected in two independent directions after reflection at the two mirrors 75 and 77 and can scan the scanning region 13.

In the illustrated example, the laser scanner 74 includes two scanning mirrors, each of which can be pivoted in one direction. In other examples, the laser scanner includes only one scanning mirror, which can be pivoted in two independent directions. Other variants of laser scanners are also conceivable.

The actuators 76 and 78 are controlled by a controller 80 as described in more detail below.

The laser beam 17 enters into a vacuum space 83, which is also defined by the vacuum chamber wall 53, through a window 81. The vacuum space 83 can be separated from the vacuum space 51 by an door 85. FIG. 1 shows a plate 87 of the door 85 in solid lines in the open position of the door and in dashed lines in the closed position of the door 85. An actuator rod 89 of the door is used to displace the plate 87 and to move the door 85 from its open position to its closed position and vice versa. The door 85 can be implemented as a vacuum closure by it being sealed off from the chamber wall 53 in order to maintain different vacuum pressures in the vacuum spaces 51 and 83. In this case the vacuum chamber 83 is evacuated via a pump port 91 connected to a vacuum pump and can be ventilated via a further port 93.

The object to be processed is mounted on an object holder 101 and can be transported back and forth between two positions together with the object holder 101. For this purpose a transportation assembly 103 is provided which includes a rod 105 having a coupler 108 at one end, with which the object holder 101 can be held in order to pull it from the right-hand position in FIG. 1, in which the object is arranged in the processing region 11 of the particle beams 5 and 9, into a left position in FIG. 1, in which the object is arranged within the processing region 13 of the laser beam 17. Likewise, the object holder 101 can be transported by the transportation assembly 103 from the left-hand position in FIG. 1 into the right-hand position in FIG. 1. The transportation assembly 103 also includes for this purpose a vacuum seal 107 provided in the vacuum chamber wall 53 and penetrated by the rod 105, which allows displacement of the rod 105 to transport the object holder 101 between its two positions, without having to ventilate the vacuum spaces 51 and 83. A rail 109 can be provided in order to support the object holder 101 while it is being transported. If the object holder 101 is arranged in the right-hand position in FIG. 1 in the vacuum space 51, the coupler 108 of the rod 105 can be released from the object holder 101, so that the rod 105 can be removed from the vacuum chamber 51 and the door 85 can be closed.

If the object holder 101 is arranged in the vacuum space 51, it is supported by a positioning device 111 which is used to displace the object holder 101 relative to the particle beams 5 and 9 such that the beams can be directed from selectable directions onto selectable locations of the object holder 101. For this purpose the positioning device 111 includes a base 113 and one or more intermediate components 115, which carry a component 117 to which the object holder 101 is fixed. The components 113, 115 and 117 can be moved relative to one another to allow a displacement of the object holder 101 in three dimensions x, y, and z, and the components can also be rotatable relative to each other in order to change orientations of the object holder 101 relative to the particle beams 5 and 9.

In the left-hand position in the vacuum space 83 in FIG. 1, the object holder 101 is arranged on a positioning device 121, which allows positioning of the object holder 101 in the processing region 13 of the laser scanner 15.

Further embodiments of processing systems in which a laser beam processing can be combined with a particle beam inspection or a particle beam processing are described in US 2010/0051828 A1, the full disclosure of which is incorporated herein by reference.

Figure 2:
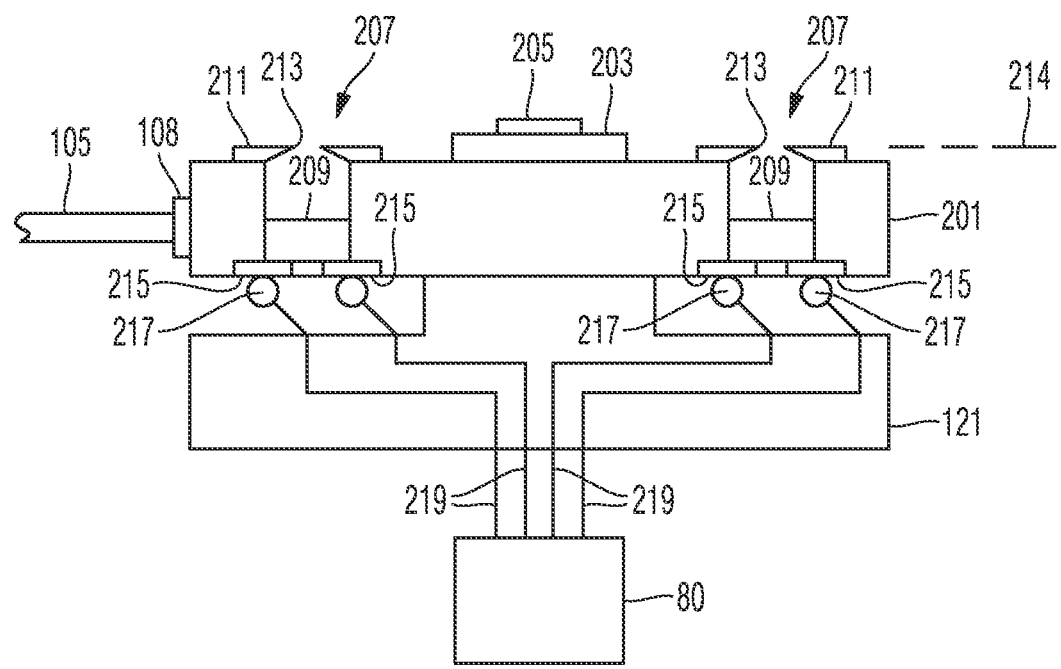
FIG. 2 is a schematic representation of an object holder in cross-section, which can be used in the laser processing system shown in FIG. 1.

FIG. 2 shows a schematic cross-sectional view of the object holder 101 in the left-hand position in FIG. 1. The object holder 101 includes a base body 201 to which an object mount 203 is attached which carries an object 205 to be processed.

In the illustrated example, the base body 201 includes three light detectors 207, two of which are shown in the cross section of FIG. 2. The light detectors 207 each include a light sensor 209, arranged at a distance from an aperture plate 211 having an aperture 213. The aperture 213 forms a well-defined detection cross-section and defines the cross-sectional area over which light can enter the light detector 207 in order to be detected by the sensor 209. The detector 207 also includes two contacts 215 of the light sensor 209, which are exposed and insolated from each other on the bottom side of the base body 201 such that they can make contact with corresponding spring contacts 217 provided on the positioning device 121 when the object holder 101 is positioned on the positioning device 121. The spring contacts 217 are connected to the controller 80 via conductors 219 such that they can receive detection signals of the sensors 209.

The light detectors 207 having the defined detection cross-sections 213 are used to determine a coordinate transformation between the laser scanner 74 and a coordinate system of the object holder 101 such that the laser beam 17 can be directed onto desired locations on the object 205. For this purpose, the positions of the detection cross-sections 213 in the coordinate system of the laser scanner are determined. A procedure for this purpose is illustrated below with reference to FIGS. 3a, 3b and 3c.

Figure 3:
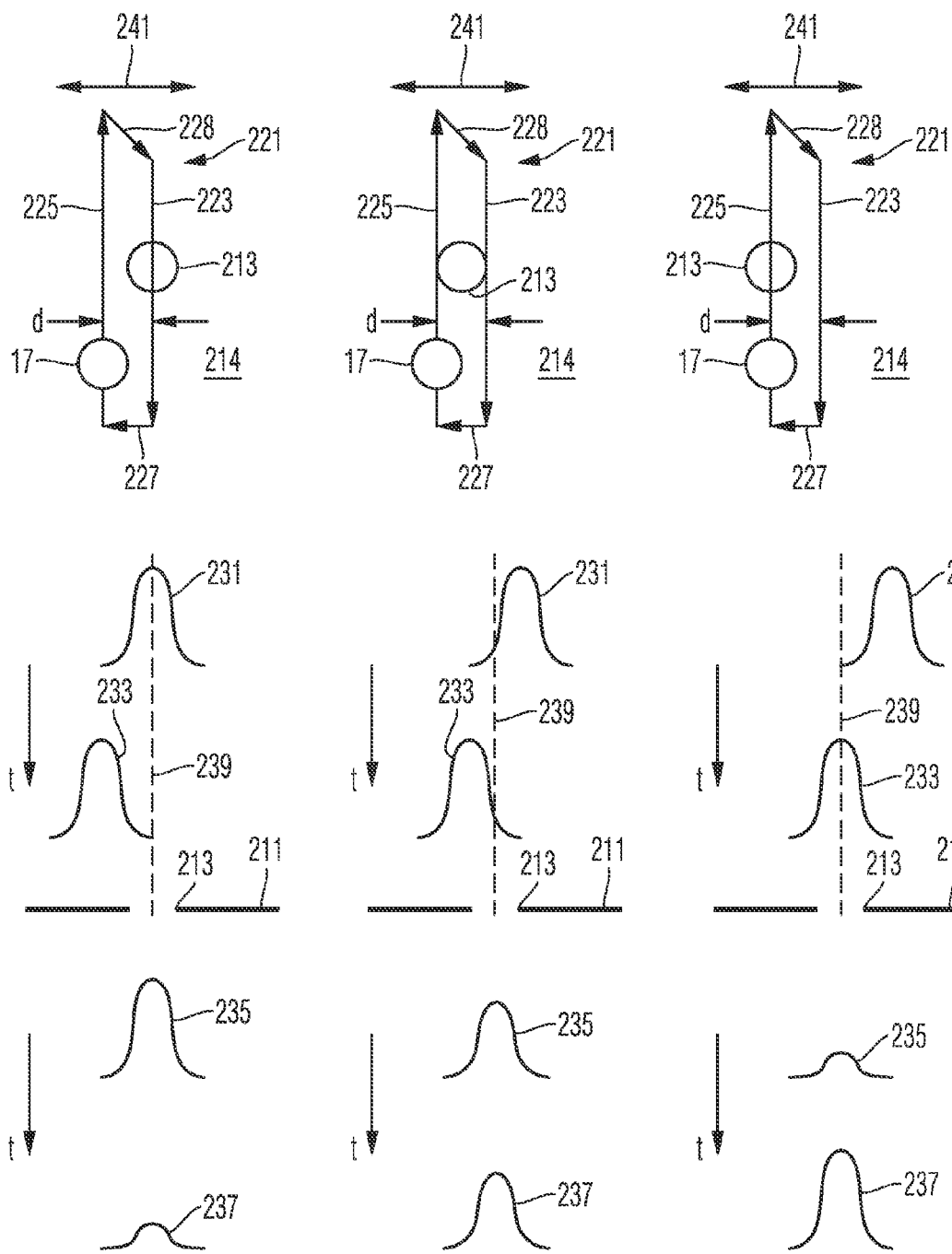
FIGS. 3a, 3b and 3c show multiple stages of a displacement of a scan path, light intensities incident on a detection cross-section and detected light intensities.

The top part of FIG. 3a shows a view of a plane 214, in which the detection cross-section 213 is arranged, and a scan path 221, along which the laser beam 17 is scanned. The scan path 221 includes a first partial path 223 and a second partial path 225 arranged at a distance d from the first partial path 223. The first and the second partial paths 223, 225 are connected to each other by intermediate paths 227 and 228 such that the first partial path 223, the intermediate path 227, the second partial path 225, the intermediate path 228 and then again the first partial path 223 are sequentially and repeatedly scanned. The two partial paths 223 and 225 are scanned in mutually opposite directions. In the illustrated example, the intermediate paths 227 are the shortest straight-line connections between the end of the one partial path and the beginning of the other partial path. However, it is also possible that the intermediate paths have different shapes, such as curved shapes rather than the shapes of straight lines. It is also possible to turn off the laser beam when the scan position of the laser scanner 74 transitions from the end of the one partial path to the beginning of the other partial path.

In the illustrated example, the first partial path 223 and the second partial path 225 are straight lines. However, the partial paths can also follow curved lines or general curves, such as arcs or spirals, provided that they extend at a distance d from each other as it will be explained in more detail below.

The diameter of the laser beam 17 in the plane of the detection cross-section 213 is shown as a circle in the top portion of FIG. 3a. In fact, the laser beam has an intensity profile which is, for example, a Gaussian profile, as shown in the central portion of FIG. 3a, where a curve represents the intensity profile of the laser beam 231 during the scanning along the first partial path 223, while a curve 233 represents the location of the intensity profile of the laser beam 17 during the scanning along the second partial path 225. It is assumed here that the first partial path 223 is scanned first and that the second partial path 225 is scanned after the first partial path, such that the second intensity profile 233 occurs later along the time axis t than the first intensity profile 231.

In bottom portion of FIG. 3a, a curve 235 represents an intensity signal detected by the controller 80 and generated by a light sensor 209 arranged downstream of the aperture plate 211 having the detection cross-section 213. The intensity signal is generated by the laser beam profile 213 during the scanning along the first partial path 223. Since the first partial path 223 coincides with the center 239 of the detection cross-section 213 in the example shown in FIG. 3a, the signal 235 has a maximum intensity.

A curve 237 in the bottom portion of FIG. 3a below represents a detection signal which is generated by the beam profile 233 during the scanning of the laser beam 17 along the second partial path 225. Since the second partial path 225 is arranged at a distance from the first partial path 223, the second partial path 225 does not coincide with the center 239 of the detection cross-section, such that a lower intensity of laser light can pass through the detection cross-section 213 to reach the light sensor 209. Accordingly, the signal 237 has a lower intensity than the signal 235. Since the first partial path 223 is scanned before the second partial path 225 in the illustrated example, the signal 237 is delayed in time (t) relative to the signal 235.

In order to define the position of the detection cross-section 213 relative to the laser scanner, it would then be possible to displace the first partial path 223 somewhat in a direction transverse to its direction of extension, and to analyze the intensity of the signal 235. For a displacement in which the intensity of the signal is a maximum, the first partial path 223 passes exactly through the center of the detection cross-section 213 such that the position of the center of the detection cross-section 213 is determined in a direction perpendicular to the extension direction of the first partial path 223 and can be equated with the scan deflection perpendicular to the extension direction of the partial path 223. However, the intensity of the signal 235 changes only slightly with variation in the position of the partial path 223, so that in this way the position of the detection cross-section 213 relative to the laser scanner 74 can be determined only with a relatively low precision.

In the illustrated example, the determination of the position takes place by the partial paths 223 and 225 being repeatedly scanned wherein the location of both partial paths 223 and 225 is continuously displaced in a direction 241. The top portions of FIGS. 3b and 3c show two examples of this continuous displacement. In the top portion of FIG. 3b, the detection cross-section 213 is in the center between the two partial paths 223 and 225 such that the two beam profiles 231 and 233 result in detection signals 235 or 237 of equal intensities, as illustrated in the bottom portion of FIG. 3b. In FIG. 3c, the displacement is further increased such that the second partial path 225 coincides with the center 239 of the detection cross-section 213. Accordingly, the detection signal 237 generated during the scanning of the second partial path 225 is greater than the detection signal 235 generated during the scanning of the first partial path 223, as is shown in the bottom portion of FIG. 3c.

In the illustrated example, the position of the detection cross-section 213 in the direction transverse to the extension direction of the two partial paths 223 and 225 is determined such that the scan path including the two partial paths 223 and 225 is displaced such that the two detection signals 235 and 237 have the same intensity, or a difference between these two intensities is a minimum or equal to zero. This has the advantage that even minor displacements of the partial paths result in relatively large differences between the two detection signals 235 and 237, so that the position of the detection cross-section can be detected with an increased accuracy. The position of the center 239 of the detection cross-section 213 in the coordinate system of the laser scanner then corresponds to the central point between the scan deflections in a direction transverse to the extension directions of the partial paths 223, 225.

For this purpose, the two partial paths 223 and 225 are located at a distance apart from each other, wherein the distance is selected such that light of the laser beam 17 is incident on the detection cross-section 213 when scanning along the first partial path 223 and when scanning along the second partial path 225. Therefore, the distance d between the two partial paths 223, 225 should be smaller than a value determined based on the diameter of the detection cross-section 213 plus a value determined based on the diameter of the laser beam 17. The value determined based on the diameter of the detection cross-section 213 can be chosen e.g. as large as the diameter of the detection cross-section 213 itself, or it can be slightly smaller, such as 0.9 times or 0.8 times the diameter of the detection cross-section 213. Similarly, the value determined based on the diameter of the laser beam 17 can be chosen e.g. as large as the diameter of the laser beam 17 in the plane of the detection cross-section itself, or it can be slightly smaller, such as 0.9 times or 0.8 times the diameter of the laser beam 17 in the plane of the detection cross-section.

The diameter of the laser beam 17 can be defined by a conventional method. For example, with a Gaussian cross-section or a similar beam cross-section, the diameter of the beam can be defined such that e.g. 90% of the beam intensity is within the diameter, and 10% of the beam intensity is outside the diameter.

Also, the distance d between the two partial paths 223 and 225 should not be too small in order to achieve a significant change in the difference between the intensities of the two signals 235 and 237 when the partial paths 223 and 225 are shifted in the direction 241. For example, the distance d should be greater than 0.3 times, 0.4 times or 0.5 times the diameter of the laser beam and/or it should be greater than 0.3 times, 0.4 times or 0.5 times the diameter the detection cross-section.

With the method explained based on FIGS. 3a to 3c, the position of the detection cross-section 213 can be accurately detected in one direction, namely the direction orthogonal to the extension direction of the partial paths 223 and 225.

Figure 4:
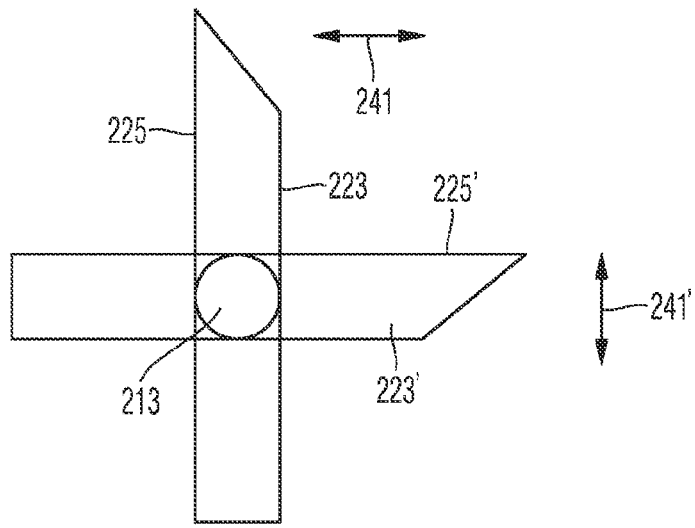
FIG. 4 is a further schematic representation of possible scan paths.

FIG. 4 illustrates an embodiment in which the position of the detection cross-section 213 can be detected in two independent directions.

In this embodiment the position is first determined in a direction transverse to the extension direction of the partial paths 223 and 225 as illustrated above with reference to FIGS. 3a to 3c. The scan path is then modified by repeatedly scanning a third partial path 223' and a fourth partial path 225', wherein the third and fourth partial paths 223' and 225' are oriented at an angle of 90° relative to the first and second partial paths 223 and 225. The position of the partial paths 223' and 225' is varied in a direction 241' until the two detected signals are all almost equal, or until a difference between these two signals is minimal or equal to zero. The position of the center of the detection cross-section 213 is therefore precisely defined both in the direction 241 and in the intended direction 241'.

Figure 5:
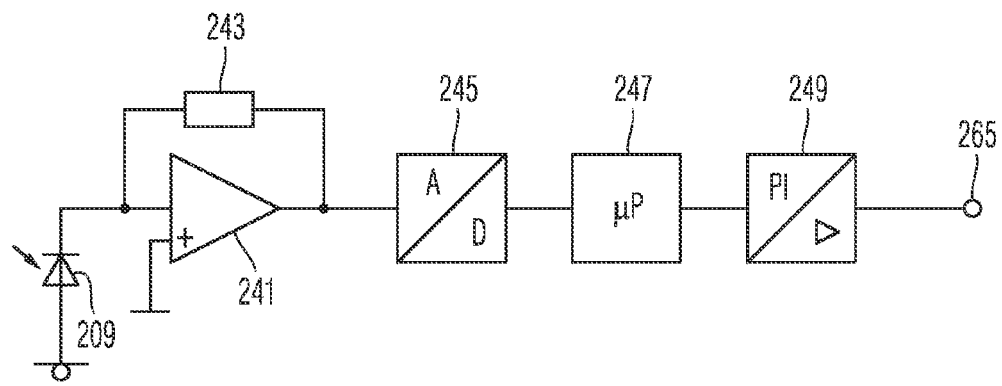
FIG. 5 is a schematic illustration of a portion of a controller of a processing system.

FIG. 5 is a schematic illustration of a portion of the controller 80 for carrying out the analysis of the detection signals illustrated above. The detection signal of the light sensor 209 is transmitted to the controller 80 via the conductor 219. The signal is converted by a current-to-voltage converter including an operational amplifier 241 and a resistor 243, and further converted by an analogue-to-digital converter 245 into a digital signal. The digital signal output by the analogue-to-digital converter 245 is analyzed by a microprocessor 247 which is configured to determine occurrence times and intensities of the detected signals, in order to compare the determined intensities with each other. The microprocessor 247 compares two temporally successive signals in terms of their intensity and determines the difference of the intensities. This difference is output to a PI controller 249, which in turn provides a control signal for the displacement of the scan path at an output 265. A further component of the controller 80, which generates the scan path and controls the actuators 76, 78 of the laser scanner 74 such that the laser beam 17 is directed along the scan path, reads the signal 265 provided at the output 265 and displaces the scan path as a function of this signal.

With the circuit schematically shown in FIG. 5 it is thus possible to displace the scan path until the two detection signals, which are generated when scanning along the first partial path 223 and scanning along the second partial path 225, have the same intensity.

Figure 6:
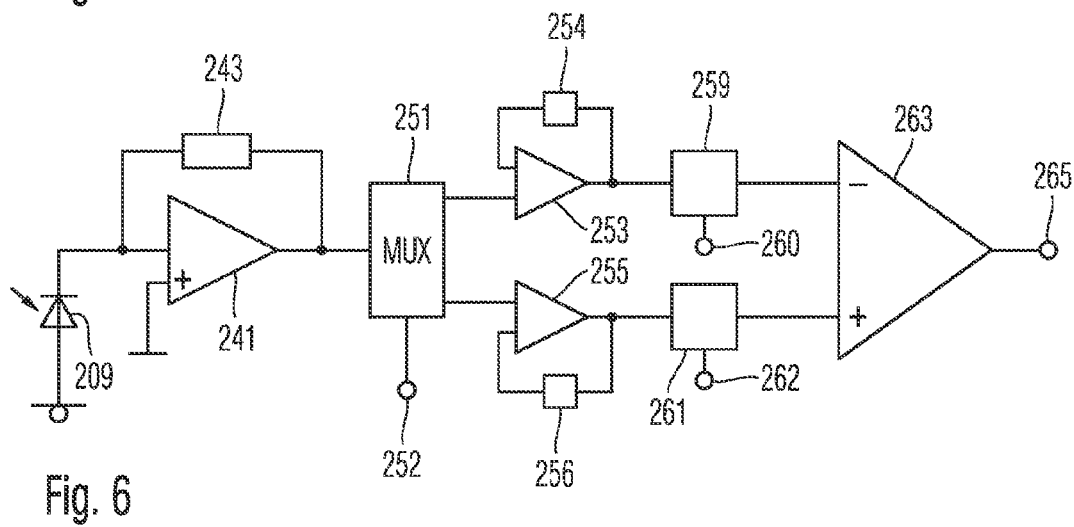
FIG. 6 is a schematic illustration of a portion of a further controller for a processing system

FIG. 6 shows an alternative embodiment of the portion of the controller shown in FIG. 5. In this embodiment, the signal generated by the sensor 209 is again converted using a current-voltage converter including an operational amplifier 241 and a resistor. However, the converted signal is supplied via a multiplexer 251 alternately to a first operational amplifier 253 with feedback resistor 254 and to a second operational amplifier 255 with feedback resistor 256, such that the first operational amplifier 253 always receives the signals which are generated when scanning along the first partial path 223 and the second operational amplifier 255 always receives the signals generated when scanning along the second partial path 225. The multiplexer 251 includes a synchronization input or reset input 252 via which it is reset at the beginning of each traversal of the first partial path 223.

The outputs of the operational amplifiers 253, 255 are connected to a latch-memories 259 and 261, respectively, which store a maximum of the amplified signal and supply the maximum to a subsequent comparator 263. A signal provided at an output 265 of the comparator thus represents the difference of the detected light intensities during the traversal of the first and second partial paths, respectively. The latch-memories 259 and 261 each have a reset input 260 or 262, so that they can be reset together with the multiplexer 251 before each traversal of the first and the second scan paths.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

What is claimed is:
1. A method, comprising:
using a laser scanner to scan a laser beam along a scan path;
detecting light intensities caused by laser light of the laser beam incident on a detection cross-section; and
determining a position of the detection cross-section relative to the laser scanner based on the detected light intensities,
wherein:
the scan path includes, in a plane which includes the detection cross-section, first and second partial paths;
the first and second partial paths extend adjacent to each other and at a distance from each other;

the distance is smaller than a diameter of the detection cross-section plus a diameter of the laser beam in the plane which includes the detection cross-section; and the distance is greater than 0.3 times the diameter of: a) the laser beam in the plane which includes the detection cross-section; or b) the detection cross-section.

2. The method of claim 1, further comprising comparing detected first light intensities caused by laser light incident on the detection cross-section during scanning along the first partial path and detected second light intensities caused by laser light incident on the detection cross-section during scanning along the second partial path.

3. The method of claim 2, further comprising repeatedly varying the scan path by displacing the first and second partial paths until the first and second detected light intensities are substantially equal.

4. The method of claim 3, wherein the position of the detection cross-section relative to the laser scanner is determined as being centrally positioned between the first and second partial paths.

5. The method of claim 1, wherein the first partial second partial paths extend at a constant distance from each other.

6. The method of claim 1, wherein the first and second partial paths each extend along a straight line.

7. The method of claim 1, wherein the first partial path is scanned in a direction which is opposite to a direction in which the second partial path is scanned.

8. The method of claim 1, wherein:
the scan path includes, in the plane which includes the detection cross-section, third and fourth partial paths which extend at a distance from each other;
the distance between the third and fourth partial paths is smaller than a diameter of the detection cross-section plus a diameter of the laser beam in the plane which includes the detection cross-section; and
the distance between the third and fourth partial paths is greater than 0.3 times the diameter of: a) the laser beam in the plane which includes the detection cross-section; or b) the detection cross-section.

9. The method of claim 8, wherein a smallest angle between the first and third partial paths is greater than 30°.

10. The method of claim 9, wherein the smallest angle is greater than 50°.

11. The method of claim 9, wherein the smallest angle is greater than 70°.

12. The method of claim 1, wherein:
the detection cross-section is provided on an object holder; and
the method further comprises determining a coordinate transformation between a coordinate system of the laser scanner and a coordinate system of the object holder based on the determined position of the detection cross-section relative to the laser scanner.

13. The method of claim 12, wherein:
two or more detection cross-sections are provided on the object holder;
the positions of the two or more detection cross-sections relative to the laser scanner are determined based on the detected light intensities; and
the coordinate transformation is determined based on the positions of the two or more detection cross-sections relative to the laser scanner.

14. The method of claim 12, further comprising processing an object mounted on the object holder with a laser beam generated by the laser scanner.

15. A processing system, comprising:
a laser scanner; and
a controller,
wherein the processing system is configured to carry out the method of claim 1.

16. A system comprising:
a laser scanner;
a detector configured to detect laser light incident on a predetermined detection cross-section of the detector; and
a controller configured to control the laser scanner and to receive detection signals from the detector,
wherein:
the controller is configured to control the laser scanner so that the laser beam is scanned along a scan path which includes, in a plane which includes the detection cross-section, a first partial path and a second partial path;
the first partial path and the second partial path extend adjacent to each other and at a distance from each other;
the distance is smaller than a diameter of the detection cross-section plus a diameter of the laser beam in the plane which includes the detection cross-section;
the distance is greater than 0.3 times the diameter of: a) the laser beam in the plane which includes the detection cross-section; or the detection cross-section;
the controller comprises a control module configured to compare detected first light intensities caused by the laser light striking the detection cross-section when scanning along the first partial path with detected second light intensities caused by the laser light striking the detection cross-section when scanning along the second partial path.

17. The processing system of claim 16, wherein the control module is configured to generate a signal which represents differences between the first and second light intensities.

18. The processing system of claim 17, wherein the controller is configured to control the laser scanner such that the first and second partial paths are displaced until the differences are minimized.

19. The processing system of claim 16, further comprising a particle beam column configured to detect a position of the detection cross-section relative to the particle beam column.

20. The processing system of claim 19, wherein the processing system is configured so that, during use, the particle beam column is used to deposit material on an object or to remove material from the object.

* * * * *

UNITED STATES PATENT AND TRADEMARK OFFICE
CERTIFICATE OF CORRECTION

PATENT NO. : 8,693,008 B2
APPLICATION NO. : 13/565147
DATED : April 8, 2014
INVENTOR(S) : Holger Doemer and Ruediger Rosenkranz Page 1 of 1

It is certified that error appears in the above-identified patent and that said Letters Patent is hereby corrected as shown below:

In the Specification:

In Col. 4, line 31, delete "system" and insert -- system. --.

In Col. 7, line 14, delete "insolated" and insert -- insulated --.

Signed and Sealed this
Fifteenth Day of July, 2014

Michelle K. Lee
*Deputy Director of the United States Patent and Trademark Office*